United States Patent
Nguyen

(10) Patent No.: US 12,147,778 B2
(45) Date of Patent: Nov. 19, 2024

(54) MACHINE LEARNING METHOD AND INFORMATION PROCESSING APPARATUS

(71) Applicant: FUJITSU LIMITED, Kawasaki (JP)

(72) Inventor: An Le Nguyen, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 277 days.

(21) Appl. No.: 17/588,358

(22) Filed: Jan. 31, 2022

(65) Prior Publication Data

US 2022/0292267 A1    Sep. 15, 2022

(30) Foreign Application Priority Data

Mar. 15, 2021  (JP) ................................. 2021-041395

(51) Int. Cl.
*G06F 40/51* (2020.01)
*G06F 40/295* (2020.01)
*G06F 40/58* (2020.01)
*G06V 30/19* (2022.01)

(52) U.S. Cl.
CPC ............ *G06F 40/51* (2020.01); *G06F 40/295* (2020.01); *G06F 40/58* (2020.01); *G06V 30/19147* (2022.01)

(58) Field of Classification Search
CPC ........ G06F 40/51; G06F 40/295; G06F 40/58; G06V 30/19147
See application file for complete search history.

(56) References Cited

U.S. PATENT DOCUMENTS

| 2012/0316862 A1* | 12/2012 | Sultan ..................... G06F 40/53 704/4 |
| 2015/0286629 A1 | 10/2015 | Abdel-Reheem et al. |
| 2020/0311352 A1* | 10/2020 | Miura ................... G06F 40/295 |
| 2022/0156461 A1* | 5/2022 | Li ........................... G06F 40/58 |

FOREIGN PATENT DOCUMENTS

| CA | 3123198 C | * | 8/2022 | ............ G06F 40/117 |
| JP | 2014-10634 A | | 1/2014 | |

OTHER PUBLICATIONS

Niehues, Jan, and Eunah Cho. "Exploiting linguistic resources for neural machine translation using multi-task learning." arXiv preprint arXiv:1708.00993 (2017). (Year: 2017).*

Li, Zhongwei, Eng Siong Chng, and Haizhou Li. "Named entity transliteration with sequence-to-sequence neural network." 2017 International Conference on Asian Language Processing (IALP). IEEE, 2017. (Year: 2017).*

(Continued)

*Primary Examiner* — Brian L Albertalli
(74) *Attorney, Agent, or Firm* — XSENSUS LLP

(57) ABSTRACT

A non-transitory computer-readable recording medium stores a program for causing a computer to execute a process, the process includes acquiring training data that includes a first sentence expressed in a first language and a second sentence expressed in a second language, identifying a named entity and parts of speech from the first sentence, and generating, based on the training data, a translation model that includes an attention mechanism for the named entity and the parts of speech.

12 Claims, 16 Drawing Sheets

(56) References Cited

OTHER PUBLICATIONS

Li, Zhonghao, and Gongshen Liu. "Optimizing attention mechanism for neural machine transition." 2018 IEEE 4th International Conference on Computer and Communications (ICCC). IEEE, 2018. (Year: 2018).*

Sennrich, Rico, and Barry Haddow. "Linguistic input features improve neural machine translation." arXiv preprint arXiv:1606.02892 (2016). (Year: 2016).*

Neubig, Graham. "Neural machine translation and sequence-to-sequence models: A tutorial." arXiv preprint arXiv:1703.01619 (2017). (Year: 2017).*

Ugawa et al., "Neural Machine Translation Incorporating Named Entity", Proceedings of the 27th International Conference on Computational Linguistics, Aug. 20-26, 2018, pp. 3240-3250.

Dinu et al., "Training Neural Machine Translation To Apply Terminology Constraints", Proceedings of the 57th Annual Meeting of the Association for Computational Linguistics, Jul. 28-Aug. 2, 2019, pp. 3063-3068.

* cited by examiner

FIG. 2

| ITEM NUMBER | SOURCE LANGUAGE SENTENCE | TARGET LANGUAGE SENTENCE |
|---|---|---|
| 1 | TEXT DATA OF SOURCE LANGUAGE SENTENCE OF ITEM NUMBER 1 | TEXT DATA OF TARGET LANGUAGE SENTENCE OBTAINED BY TRANSLATING SOURCE LANGUAGE SENTENCE OF ITEM NUMBER 1 INTO TARGET LANGUAGE |
| 2 | TEXT DATA OF SOURCE LANGUAGE SENTENCE OF ITEM NUMBER 2 | TEXT DATA OF TARGET LANGUAGE SENTENCE OBTAINED BY TRANSLATING SOURCE LANGUAGE SENTENCE OF ITEM NUMBER 2 INTO TARGET LANGUAGE |
| 3 | TEXT DATA OF SOURCE LANGUAGE SENTENCE OF ITEM NUMBER 3 | TEXT DATA OF TARGET LANGUAGE SENTENCE OBTAINED BY TRANSLATING SOURCE LANGUAGE SENTENCE OF ITEM NUMBER 3 INTO TARGET LANGUAGE |
| ... | ... | ... |

| ITEM NUMBER | NAMED ENTITY | TYPE |
|---|---|---|
| 1 | White House | LOCATION |
| 2 | Michael Joseph Jackson | PERSON'S NAME |
| 3 | September 11th | EVENT |
| 4 | mucopolysaccharidosis type IVA | GENE |
| 5 | CEPR | MEDICINE |
| ... | ... | ... |

(142)

President lives in White House,   /20

O O O B-LOC E-LOC   /25

FIG. 15

All alternates Stellvertreter shall be eleted for one term  ⌐12

⬇

All alternates Stellvertreter shall be eleted for one term  ⌐12a
0   1         2         0    0    0    0    0    0

⬇

All Stellvertreter shall be eleted for one term  ⌐12b
0   2              0    0    0    0    0    0

All Stellvertreter werden f¨ur eine Amtszeit gew¨ahlt  ⌐13

MACHINE LEARNING METHOD AND INFORMATION PROCESSING APPARATUS

CROSS-REFERENCE TO RELATED APPLICATION

This application is based upon and claims the benefit of priority of the prior Japanese Patent Application No. 2021-041395, filed on Mar. 15, 2021, the entire contents of which are incorporated herein by reference.

FIELD

The embodiments discussed herein are related to a machine learning method for training a translation model.

BACKGROUND

With globalization, it is possible to refer to sentences written in various languages. In a case where a user refers to a sentence written in a language different from a language of his/her country, there is a need for easily understanding such a sentence. To cope with this need, the development of machine translation for translating a sentence written in a source language into a sentence written in a target language is underway.

When a word or phrase having important information in a sentence is not correctly translated, translation of the entire sentence is affected. For example, a named entity may be incorrectly translated into a common noun or a verb in some cases. FIG. 14 is a diagram for describing an example in which translation is not performed correctly.

FIG. 14 illustrates a case where a sentence 10 in a source language (Japanese) is translated into a sentence 11 in a target language (English). "Genki" 10a included in the sentence 10 is an adjective, while "Genki" 10b included in the sentence 10 is a named entity. "Genki" 10a is correctly translated into "fine" 11a in the sentence 11, while "Genki" 10b is incorrectly translated into "fine" 11b in the sentence 11.

To overcome the issue related to the named entity described in FIG. 14, there are first and second related-art techniques. FIG. 15 is a diagram for describing the first related-art technique. In FIG. 15, it is assumed that a sentence written in a source language (English) is a sentence 12 and a sentence written in a target language (German) is a sentence 13.

In the first related-art technique, an append sentence 12a is generated using a terminology dictionary regarding named entities by assigning "0" to a word not listed in the terminology dictionary, "1" to a source-language named entity listed in the terminology dictionary, and "2" to a target-language named entity listed in the terminology dictionary among words included in the sentence 12. In the first related-art technique, a replace sentence 12b is generated in which the named entity assigned "1" in the append sentence 12a is deleted.

In the first related-art technique, a vector obtained by combining a vector of the sentence 12 and a vector of the replace sentence 12b is input to an encoder-decoder model, and machine learning is performed such that a value output from a decoder approaches a vector of the sentence 13.

In the second related-art technique, a tag is assigned to a named entity included in a sentence in a source language, a vector obtained by combining a vector of words in the source language and a vector of the tag of the named entity is input to an encoder-decoder model, and machine learning is performed such that a value output from a decoder approaches a vector of a sentence in a target language. In the second related-art technique, a chunk-level long short-term memory (LSTM) layer is used as a hidden layer on an encoder side.

Dinu et al., "*Training Neural Machine Translation To Apply Terminology Constraints*", 2019 is disclosed as related art.

SUMMARY

According to an aspect of the embodiments, a non-transitory computer-readable recording medium stores a program for causing a computer to execute a process, the process includes acquiring training data that includes a first sentence expressed in a first language and a second sentence expressed in a second language, identifying a named entity and parts of speech from the first sentence, and generating, based on the training data, a translation model that includes an attention mechanism for the named entity and the parts of speech.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram illustrating an example of a data structure of training data;

FIG. 3 is a diagram illustrating an example of a data structure of a named entity dictionary;

FIG. 15 is a diagram for describing a first related-art technique; and

DESCRIPTION OF EMBODIMENTS

In the first related-art technique, in a case where a named entity registered in the terminology dictionary is a word with multiple meanings, a meaning with a high use rate is prioritized. Consequently, mistranslation may occur in some cases.

Figure 16:
FIG. 16 is a diagram for describing an issue of the first related-art technique.

FIG. 16 is a diagram for describing an issue of the first related-art technique. FIG. 16 illustrates a case where a sentence 14 in a source language (English) is translated into a sentence 15 in a target language (Japanese). A named entity "VHL" 14a included in the sentence 14 may be used as a gene name in some cases and may be used as a disease name in some cases. In the case illustrated in FIG. 16, translating VHL included in the sentence 14 into the gene name is correct. However, in the translated sentence 15, VHL is incorrectly translated into "VHLbyo" (disease name).

In the second related-art technique, in a case where a word is translated into a target language, useful named entity information may not be taken into account in some cases or not-useful named entity information may be memorized. Consequently, mistranslation of the word may occur in some cases.

Embodiments disclosed by this application will be described in detail below based on the drawings. These embodiments do not limit this disclosure.

First Embodiment

Figure 1:
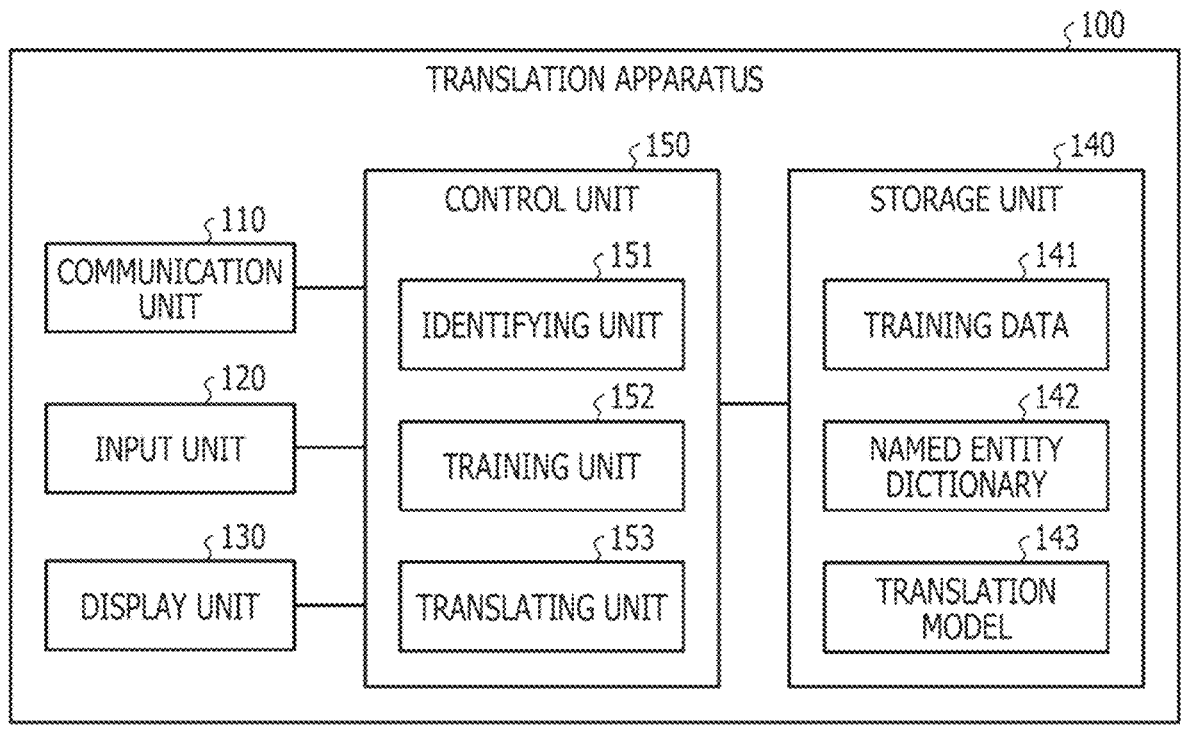
FIG. 1 is a block diagram illustrating a functional configuration of a translation apparatus according to a first embodiment.

FIG. 1 is a block diagram illustrating a functional configuration of a translation apparatus according to a first embodiment. As illustrated in FIG. 1, this translation apparatus 100 includes a communication unit 110, an input unit 120, a display unit 130, a storage unit 140, and a control unit 150.

The communication unit 110 performs data communication with an external apparatus (not illustrated) via a network. For example, the communication unit 110 receives training data 141 (described later) and the like from the external apparatus.

The input unit 120 is a device or interface for inputting data. For example, by operating the input unit 120, a user inputs, to the translation apparatus 100, information of a source language sentence to be translated.

The display unit 130 displays information output from the control unit 150. For example, the display unit 130 displays a translation result or the like output from the control unit 150.

The storage unit 140 stores data, a program to be executed by the control unit 150, and the like. The storage unit 140 includes the training data 141, a named entity dictionary 142, and a translation model 143. The storage unit 140 is an example of a storage device and is, for example, a hard disk, a memory, or the like.

The training data 141 holds a sentence in a source language and a sentence in a target language in association with each other. A sentence in the source language is referred to as a "source language sentence". A sentence in the target language is referred to as a "target language sentence". A sentence translated from the source language sentence is the target language sentence. The source language sentence corresponds to a first sentence expressed in a first language. The target language sentence corresponds to a second sentence expressed in a second language.

FIG. 2 is a diagram illustrating an example of a data structure of the training data. As illustrated in FIG. 2, the training data 141 associates an item number, a source language sentence, and a target language sentence with one another. The item number is a number indicating a record (a set of a source language sentence and a target language sentence) of the training data 141. The source language sentence is text data written in the source language. The target language sentence is text data written in the target language.

For example, when the source language is set to "English" and the target language is set to "Japanese", a target language sentence corresponding to a source language sentence "President lives in White House" is "Daitoryowa Howaitohausuni sumu".

The named entity dictionary 142 holds a named entity in the source language and a type of the named entity in association with each other. FIG. 3 is a diagram illustrating an example of a data structure of the named entity dictionary. As illustrated in FIG. 3, the named entity dictionary 142 associates an item number, a named entity, and a type with one another. The item number is a number indicating a record (a set of a named entity and a type) of the named entity dictionary 142. The named entity is a named entity used in the source language. The type is a type of the named entity. For example, examples of the type of the named entity include an organization, a person's name, a location, an event, a medicine, and so on.

Figure 4:
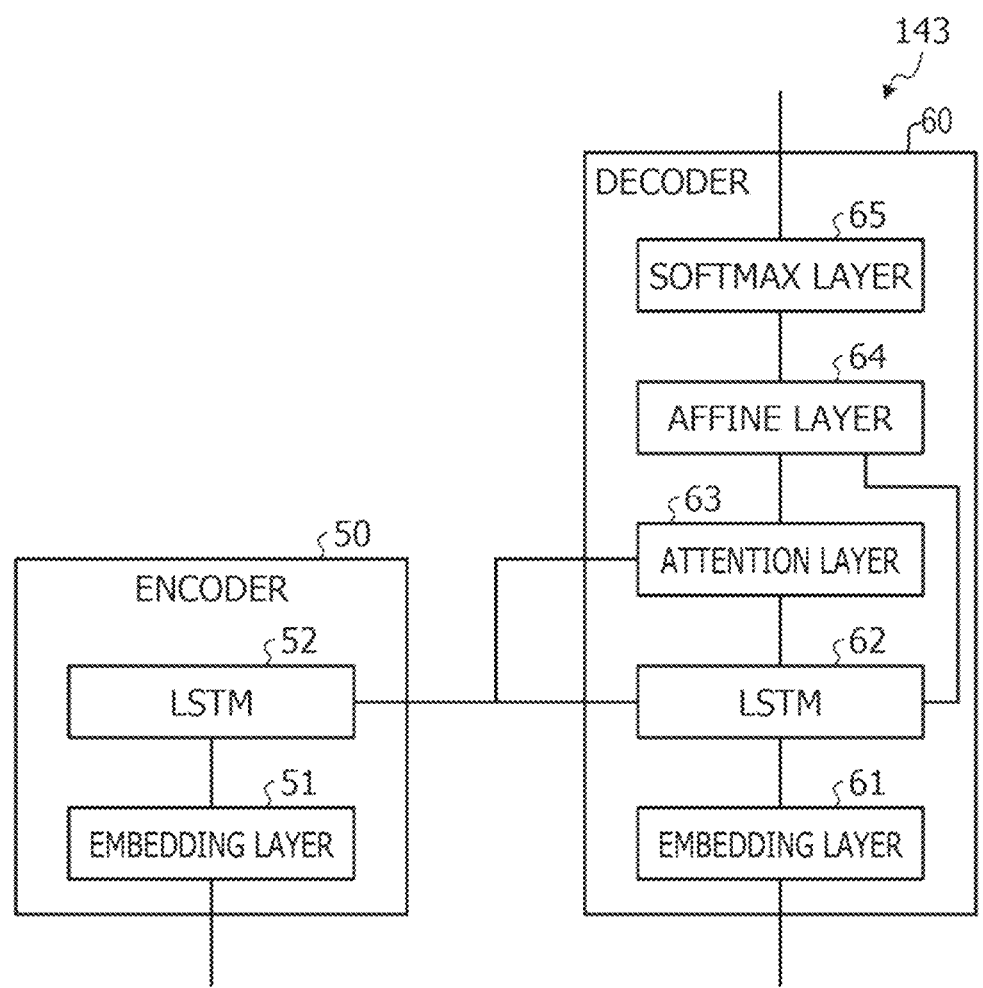
FIG. 4 is a diagram illustrating an example of a structure of a translation model according to the first embodiment.

The translation model 143 is a machine learning model for translating a source language sentence into a target language sentence. FIG. 4 is a diagram illustrating an example of a structure of the translation model according to the first embodiment. As illustrated in FIG. 4, this translation model 143 includes an encoder 50 and a decoder 60.

The encoder 50 includes an embedding layer 51 and LSTM 52.

The embedding layer 51 gives a vector to an input word. For example, individual words of a source language sentence in the training data 141 are input to the embedding layer 51 sequentially from the beginning, and respective vectors are output sequentially to the LSTM 52.

The LSTM 52 introduces a memory cell to a normal recurrent neural network (RNN), and controls, with a plurality of gates, inputting, forgetting, and outputting. Each time the LSTM 52 receives an input of a vector from the embedding layer 51, the LSTM 52 outputs a hidden vector to the decoder 60.

The decoder 60 includes an embedding layer 61, LSTM 62, an attention layer 63, an affine layer 64, and a softmax layer 65.

The embedding layer 61 gives a vector to an input word. For example, when machine learning is performed, <BOS> is input first. Then, individual words of a target language sentence in the training data 141 are input to the embedding layer 61 sequentially from the beginning, and respective vectors are output sequentially to the LSTM 62.

The LSTM 62 introduces a memory cell to a normal RNN, and controls, with a plurality of gates, inputting, forgetting, and outputting. Each time the LSTM 62 receives an input of a vector from the embedding layer 61, the LSTM 62 outputs a hidden vector to the attention layer 63 and the affine layer 64.

The attention layer 63 ignores unrelated information and selectively pays attention to a portion highly related to input information. The attention layer 63 calculates a context vector, based on the hidden vector input from the encoder 50 and the hidden vector input from the LSTM 62. The attention layer 63 outputs the context vector, which is a calculation result, to the affine layer 64. The attention layer 63 corresponds to an "attention mechanism".

The affine layer 64 is a fully connected layer and performs calculation based on parameters. The affine layer 64 receives, as an input, a vector obtained by combining the context vector output from the attention layer 63 and the hidden vector output from the LSTM 62, and outputs a calculation result to the softmax layer 65.

The softmax layer 65 normalizes input values and performs an arithmetic operation so that an output sum becomes equal to 1. The softmax layer 65 outputs a probability of each of the words of the target language sentence by using the value input from the affine layer 64.

In the translation model 143 described in FIG. 4, the description has been given by using the LSTMs 52 and 62. However, RNNs may be used instead of the LSTMs.

The description returns to FIG. 1. The control unit 150 is responsible for control of the entire translation apparatus 100. The control unit 150 includes an identifying unit 151, a training unit 152, and a translating unit 153.

The identifying unit 151 acquires a source language sentence and a target language sentence from the training data 141. The identifying unit 151 performs morphological analysis or the like on the source language sentence and divides the source language sentence into a plurality of words. The identifying unit 151 identifies a named entity among the words of the source language sentence, based on the individual words of the source language sentence and the named entity dictionary 142.

The identifying unit 151 generates named entity identifying information, based on the named entity identified from the source language sentence. The identifying unit 151 assigns a symbol "O" to a word not corresponding to the named entity and assigns a symbol of named entities to a word corresponding to the named entity, among the words included in the source language sentence.

Figure 5:
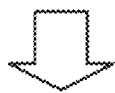
FIG. 5 is a diagram for describing processing performed by an identifying unit.

FIG. 5 is a diagram for describing processing performed by the identifying unit. In FIG. 5, it is assumed that a sentence 20 that is a source language sentence is "President lives in White House". It is assumed that, in this sentence, "White House" is the identified named entity. The identifying unit 151 generates named entity identifying information 25 by replacing words that are not named entities with the symbol "O" and replacing the named entity "White House" with a symbol "B (begin)-LOC, E (end)-LOC".

The identifying unit 151 outputs information on the source language sentence, the named entity identifying information, and the target language sentence to the training unit 152. The identifying unit 151 repeatedly performs the above-described processing on each source language sentence included in the training data 141.

In a case where a source language sentence to be translated is acquired from the input unit 120 at the time of translation, the identifying unit 151 generates named entity identifying information based on the source language sentence to be translated. The identifying unit 151 outputs the source language sentence and the named entity identifying information to the translating unit 153. The identifying unit 151 may acquire the source language sentence to be translated from an external apparatus via the communication unit 110.

The training unit 152 trains the translation model 143 including an attention mechanism for named entities, based on a source language sentence, named entity identifying information, and a target language sentence.

An example of processing performed by the training unit 152 will be described by using FIG. 4. By inputting words of a source language sentence to the embedding layer 51 of the encoder 50 in time series, the training unit 152 causes a hidden vector to be output from the LSTM 52. It is assumed that the hidden vector output from the LSTM 52 by inputting the words of the source language sentence to the embedding layer 51 in time series is denoted by H={$h_1$, . . . , $h_n$}. It is assumed that the hidden vector output from the LSTM 52 when a j-th word in the source language sentence is input to the embedding layer 51 is denoted by $h_j$.

By inputting symbols of named entity identifying information to the embedding layer 51 of the encoder 50 in time series, the training unit 152 causes a hidden vector to be output from the LSTM 52. It is assumed that the hidden vector output from the LSTM 52 by inputting the symbols of the named entity identifying information to the embedding layer 51 in time series is denoted by D={$d_1$, . . . , $d_n$}. It is assumed that the hidden vector output from the LSTM 52 when a j-th symbol in the named entity identifying information is input to the embedding layer 51 is denoted by $d_j$.

The hidden vectors H and D calculated by the encoder 50 are input to the LSTM 62 and the attention layer 63 of the decoder 60.

By inputting <BOS> first and then words of a target language sentence in the training data 141 to the embedding layer 61 of the decoder 60 in time series, the training unit 152 causes a vector to be output from the embedding layer 61 to the LSTM 62. In this manner, a hidden vector is caused to be output from the LSTM 62. It is assumed that the hidden vector output from the LSTM 62 by inputting <BOS> and the words of the target language sentence to the embedding layer 61 in time series is denoted by S={$s_1$, . . . , $s_n$}. A hidden vector $s_{i-1}$ output from the LSTM 62 is an i-th word among the words of the target language sentence.

The attention layer 63 calculates attention for the source language, based on the hidden vector H calculated by the encoder 50 and the hidden vector S output from the LSTM 62. For example, the attention layer 63 calculates the attention for the source language, based on Equation (1). $e_{ij}$ included in Equation (1) is calculated by using Equation (2). $e_{ij}$ indicates a degree of similarity between $s_{i-1}$ and $h_j$.

$$att = \frac{\exp(e_{ij})}{\sum_{k=1}^{n} \exp(e_{ik})} \quad (1)$$

$$e_{ij} = sim(s_{i-1}, h_j) \quad (2)$$

The attention layer 63 calculates attention for the named entity, based on the hidden vector D calculated by the encoder 50 and the hidden vector S output from the LSTM 62. For example, the attention layer 63 calculates the attention for the named entity, based on Equation (3). $sim(s_{i-1}, d_j)$ included in Equation (3) indicates a degree of similarity between $s_{i-1}$ and $d_j$. The hidden vector D is defined as indicated by Equation (4).

$$att\_m = \frac{\exp(sim(s_{i-1}, d_j))}{\sum_{j'=1}^{n} \exp(sim(s_{i-1}, d_{j'}))} \quad (3)$$

$$d_j \in D = \{d_1, \ldots, d_n\} \quad (4)$$

The attention layer 63 calculates joint attention for the source language sentence and the named entity, based on Equation (5). A value that is greater than or equal to 0 and is less than or equal to 1 is set in advance for λ included in Equation (5).

$$\text{att\_joint} = \lambda * \text{att} + (1-\lambda) * \text{att\_m} \quad (5)$$

The attention layer 63 calculates a context vector $c_i$, based on the calculation result of the joint attention. The context vector $c_i$ is calculated by using Equation (6). The attention layer 63 outputs the calculated context vector $c_i$ to the affine layer 64.

$$c_i = \sum_{j=1}^{n} \text{att\_joint } h_j \quad (6)$$

The affine layer 64 receives, as an input, a vector obtained by combining the context vector $c_i$ output from the attention layer 63 and the hidden vector $s_i$ output from the LSTM 62, and outputs a calculation result.

The training unit 152 adjusts the parameters of the encoder 50 and the decoder 60 such that an error between a vector $v_i$ output from the affine layer 64 and a vector of the i-th word of the target language sentence decreases. For example, the training unit 152 adjusts the parameters of the encoder 50 and the decoder 60 by using a backpropagation method or the like.

The training unit 152 trains the translation model 143 by repeatedly performing the above-described processing each time the training unit 152 acquires information on a source language sentence, named entity identifying information, and a target language sentence from the identifying unit 151.

The description returns to FIG. 1. The translating unit 153 translates a source language sentence to be translated into a target language sentence by using the source language sentence and named entity identifying information of this source language sentence, which are acquired from the identifying unit 151, and by using the trained translation model 143. In the following description regarding the translating unit 153, a source language sentence to be translated is simply referred to as a source language sentence.

An example of processing performed by the translating unit 153 will be described by using FIG. 4. By inputting words of a source language sentence to the embedding layer 51 of the encoder 50 in time series, the translating unit 153 causes a hidden vector to be output from the LSTM 52. It is assumed that the hidden vector output from the LSTM 52 by inputting the words of the source language sentence to the embedding layer 51 in time series is denoted by H= $\{h_1, \ldots, h_n\}$. It is assumed that the hidden vector output from the LSTM 52 when a j-th word in the source language sentence is input to the embedding layer 51 is denoted by $h_j$.

By inputting symbols of named entity identifying information to the embedding layer 51 of the encoder 50 in time series, the translating unit 153 causes a hidden vector to be output from the LSTM 52. It is assumed that the hidden vector output from the LSTM 52 by inputting the symbols of the named entity identifying information to the embedding layer 51 in time series is denoted by D=$\{d_1, \ldots, d_n\}$. It is assumed that the hidden vector output from the LSTM 52 when a j-th symbol in the named entity identifying information is input to the embedding layer 51 is denoted by $d_j$.

The hidden vectors H and D calculated by the encoder 50 are input to the LSTM 62 and the attention layer 63 of the decoder 60.

Unlike the training unit 152, the translating unit 153 generates each word in each step. The translating unit 153 first inputs <BOS> to the embedding layer 61 of the decoder 60. Then, by inputting vectors (words in the target language corresponding to the respective vectors) output from the affine layer 64 in time series, the translating unit 153 causes a vector to be output from the embedding layer 61 to the LSTM 62. In this manner, a hidden vector is caused to be output from the LSTM 62. It is assumed that the hidden vector output from the LSTM 62 by inputting <BOS> and each word in each step to the embedding layer 61 is denoted by S=$\{s_1, \ldots, s_n\}$. A hidden vector $s_{i-1}$ output from the LSTM 62 is an i-th word among the words of the target language sentence.

The attention layer 63 calculates attention for the source language, based on the hidden vector H calculated by the encoder 50 and the hidden vector S output from the LSTM 62. The attention for the source language is calculated by using Equations (1) and (2).

The attention layer 63 calculates joint attention for the source language sentence and the named entity, based on the hidden vector D calculated by the encoder 50 and the hidden vector S output from the LSTM 62. The joint attention for the source language sentence and the named entity is calculated based on Equation (5).

The attention layer 63 calculates a context vector $c_i$, based on the calculation result of the joint attention. The context vector $c_i$ is calculated by using Equation (6). The attention layer 63 outputs the calculated context vector $c_i$ to the affine layer 64.

The affine layer 64 receives, as an input, a vector obtained by combining the context vector $c_i$ output from the attention layer 63 and the hidden vector $s_i$ output from the LSTM 62, and outputs a calculation result to the softmax layer 65.

The softmax layer 65 normalizes input values and performs an arithmetic operation so that an output sum becomes equal to 1. The softmax layer 65 outputs a probability of each of the words of the target language sentence by using the value input from the affine layer 64. Based on the probabilities of the respective words output from the softmax layer 65, the translating unit 153 generates a target language sentence by repeatedly performing processing of conversion into the word that has the highest probability. The translating unit 153 may output the generated target language sentence as a translation result to the display unit 130 for display, or may transmit the translation result to an external apparatus.

An example of a procedure of processing performed by the translation apparatus 100 according to the first embodiment will be described next. Processing performed at the time of training and processing performed at the time of translation by the translation apparatus 100 will be described in order.

Figure 6:
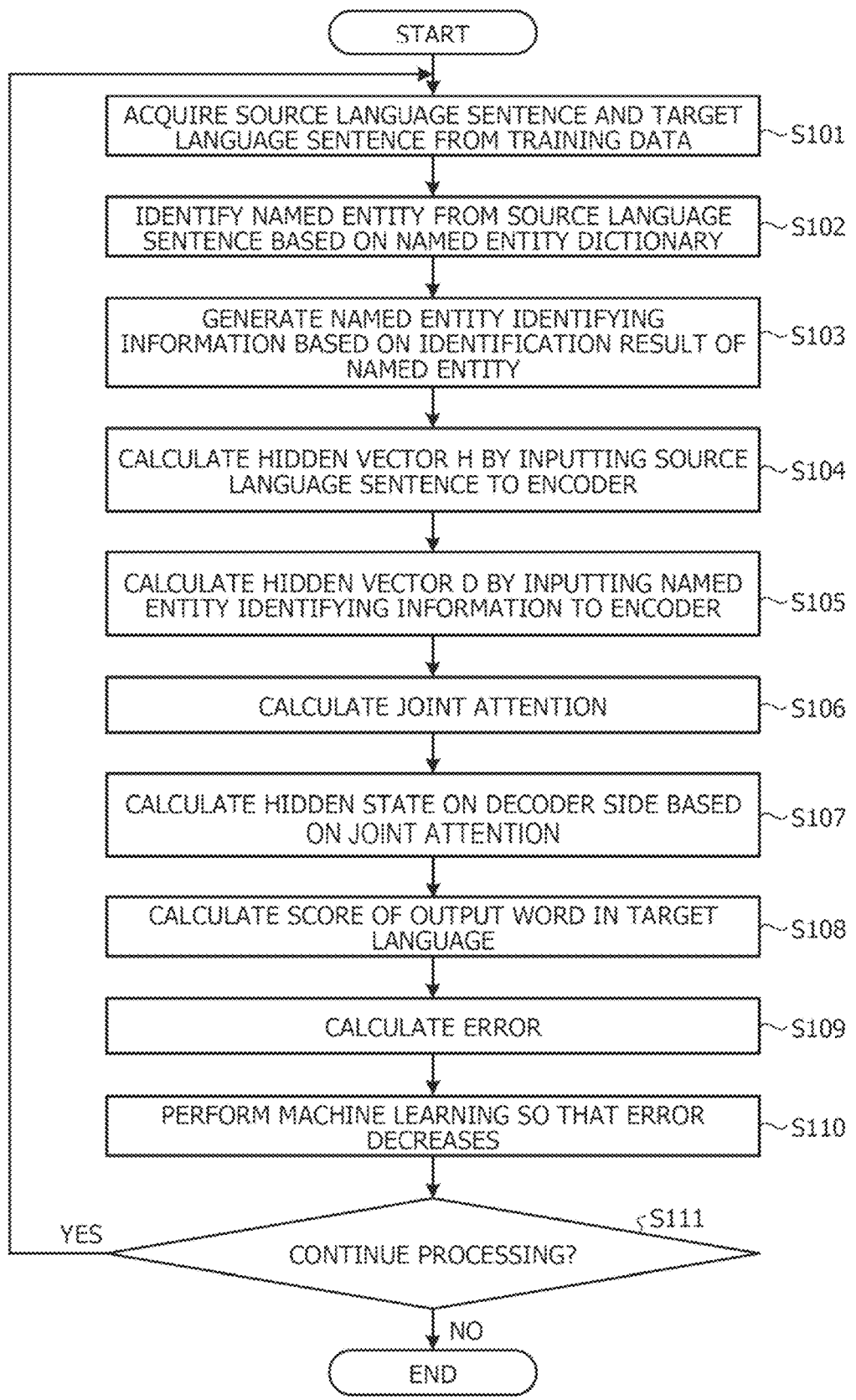
FIG. 6 is a flowchart of processing performed at the time of training according to the first embodiment.

FIG. 6 is a flowchart of processing at the time of training according to the first embodiment. As illustrated in FIG. 6, the identifying unit 151 of the translation apparatus 100 acquires a source language sentence and a target language sentence from the training data 141 (step S101). The identifying unit 151 identifies a named entity from the source language sentence, based on the named entity dictionary 142 (step S102).

The identifying unit 151 generates named entity identifying information, based on the identification result of the named entity (step S103). The training unit 152 of the translation apparatus 100 calculates the hidden vector H by inputting the source language sentence to the encoder 50 (step S104). The training unit 152 calculates the hidden vector D by inputting the named entity identifying information to the encoder 50 (step S105).

The training unit 152 calculates joint attention by using the attention layer 63 (step S106). Based on the joint attention, the training unit 152 calculates a hidden state on the decoder 60 side (step S107). The training unit 152 calculates a score of an output word in the target language (step S108). The training unit 152 calculates an error between the value output from the affine layer 64 and the vector of the word in the target language sentence (step S109). The training unit 152 performs machine learning so that the error decreases (step S110).

In a case where the processing is to be continued (Yes in step S111), the translation apparatus 100 causes the processing to proceed to step S101. On the other hand, in a case where the processing is not to be continued (No in step S111), the translation apparatus 100 ends training of the translation model 143.

Figure 7:
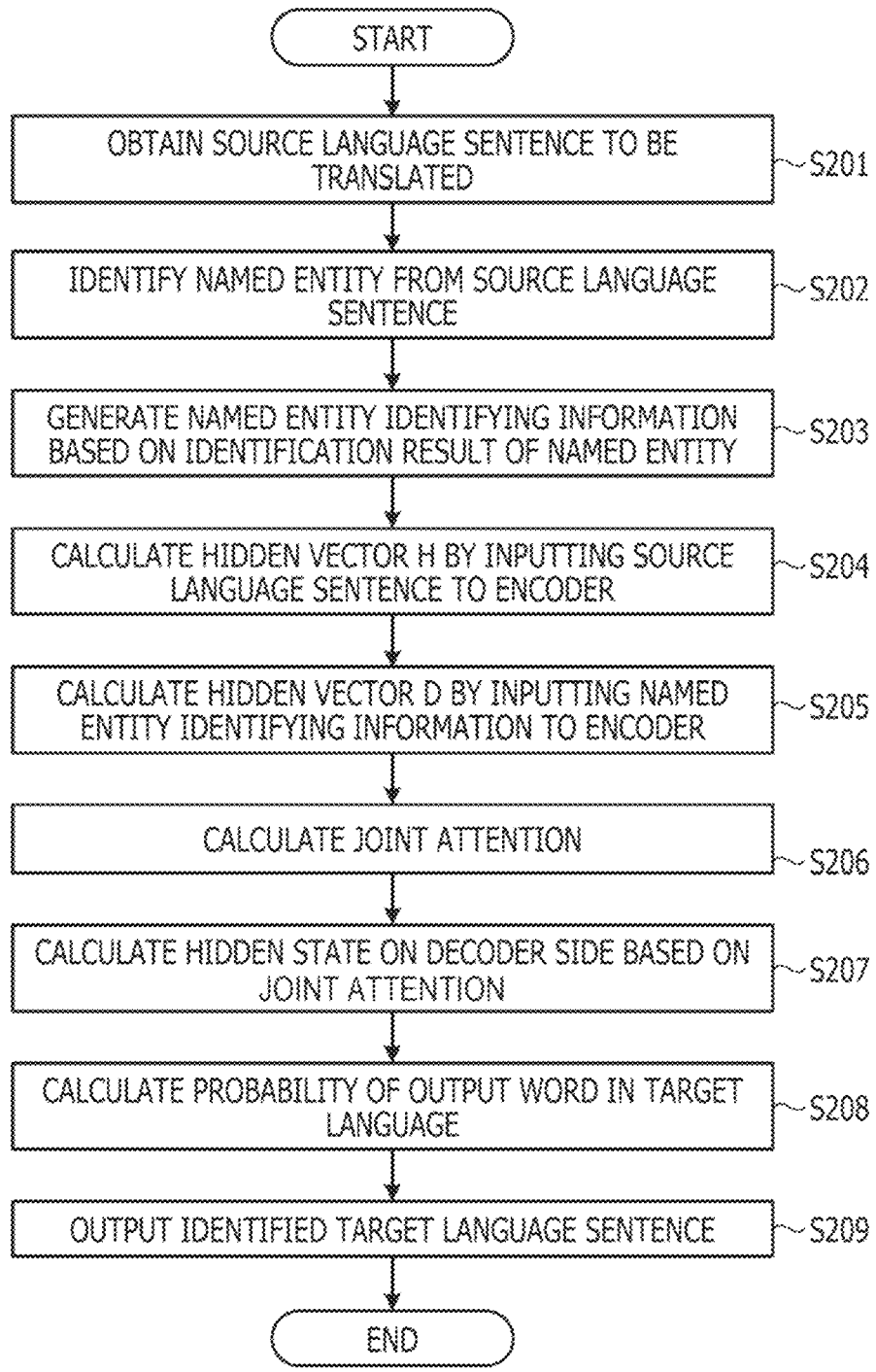
FIG. 7 is a flowchart of processing performed at the time of translation according to the first embodiment.

FIG. 7 is a flowchart of processing at the time of translation according to the first embodiment. As illustrated in FIG. 7, the identifying unit 151 of the translation apparatus 100 acquires a source language sentence to be translated from the input unit 120 (step S201). The identifying unit 151 identifies a named entity from the source language sentence, based on the named entity dictionary 142 (step S202).

The identifying unit 151 generates named entity identifying information, based on the identification result of the named entity (step S203). The translating unit 153 of the translation apparatus 100 calculates the hidden vector H by inputting the source language sentence to the encoder 50 (step S204). The translating unit 153 calculates the hidden vector D by inputting the named entity identifying information to the encoder 50 (step S205).

The translating unit 153 calculates joint attention by using the attention layer 63 (step S206). Based on the joint attention, the translating unit 153 calculates a hidden state on the decoder 60 side (step S207). The translating unit 153 calculates a probability of an output word in the target language (step S208). The processing of steps S207 and S208 is repeatedly performed until a special character <EOS> indicating the end of the sentence is output. The translating unit 153 outputs the identified target language sentence to the display unit 130 (step S209).

Effects of the translation apparatus 100 according to the first embodiment will be described next. When performing machine learning by using the training data 141, the translation apparatus 100 identifies a named entity in the source language and generates the translation model 143 including an attention mechanism for named entities. The use of this translation model 143 enables translation to be performed while taking into account a balance between the meaning of a word in the source language sentence and the named entity. Thus, mistranslation of a word with multiple meanings including a named entity may be avoided.

Figure 8:
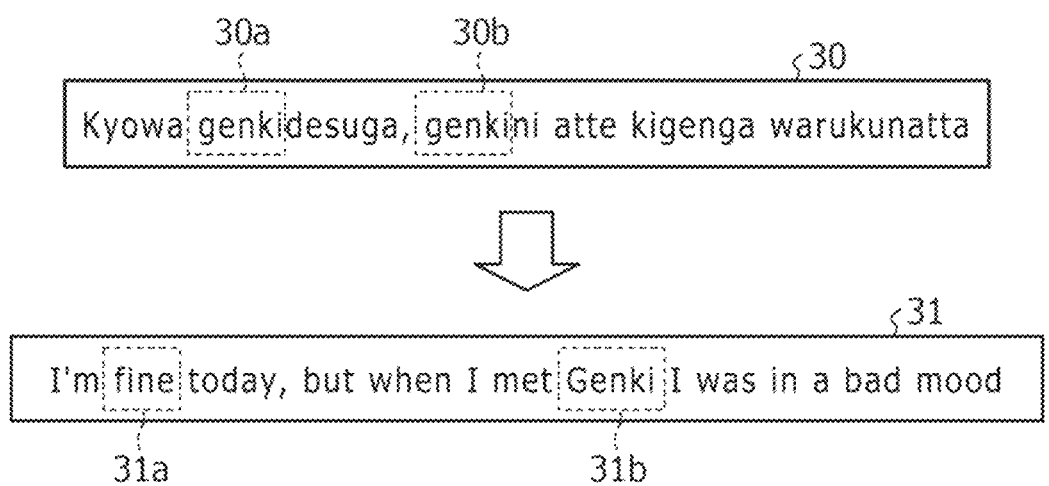
FIG. 8 is a diagram illustrating a translation example obtained by the translation apparatus according to the first embodiment.
Figure 14:
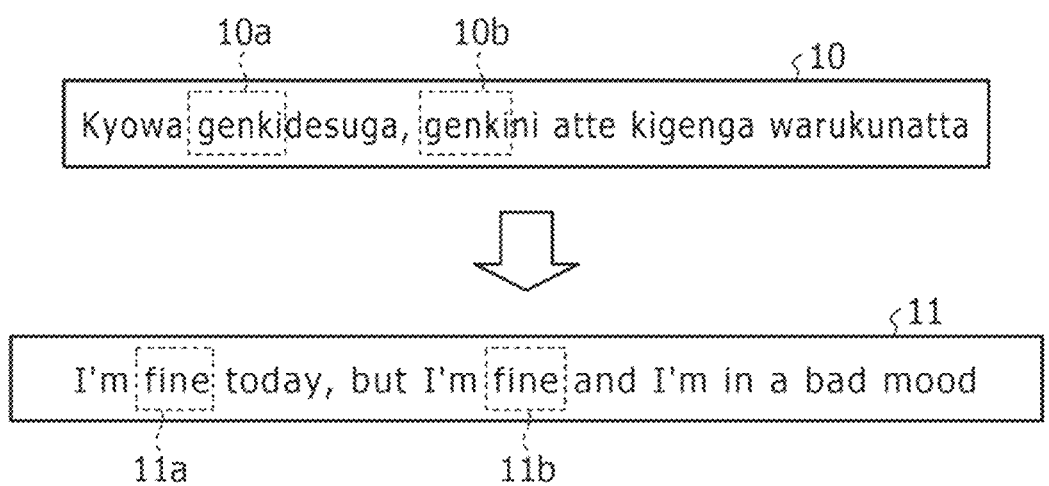
FIG. 14 is a diagram for describing an example in which translation is not performed correctly.

FIG. 8 is a diagram illustrating a translation example obtained by the translation apparatus according to the first embodiment. For example, when a source language sentence 30 is input to and translated by the translation apparatus 100, the source language sentence 30 is translated into a target language sentence 31. As illustrated in FIG. 8, "genki (adjective)" 30a in the source language sentence 30 is translated into "fine" 31a in the target language sentence 31, and "genki (named entity)" 30b in the source language sentence 30 is translated into "Genki" 31b in the target language sentence 31. For example, the translation result obtained by the translation apparatus 100 according to the first embodiment is more appropriate in terms of translation than the translation result obtained with the related-art technique described in FIG. 14.

Since the translation apparatus 100 performs translation by using joint attention obtained by integrating attention for the source language sentence and attention for the named entity, a probability distribution becomes smooth. Thus, the translation accuracy for an unknown word may be improved.

In the first embodiment described above, the translation apparatus 100 identifies a named entity from a source language sentence and calculates joint attention. However, the configuration is not limited to this. The translation apparatus 100 may further identify parts of speech or the like and calculate joint attention.

For example, the identifying unit 151 generates part-of-speech identifying information by comparing each word of the source language sentence with a part-of-speech dictionary, identifying the part of speech of each word, and converting each word into a symbol (a symbol that uniquely represents the part of speech).

By inputting the part-of-speech identifying information in addition to the source language sentence and the named entity identifying information to the encoder 50, the training unit 152 calculates the hidden vector H of the source language sentence, the hidden vector D of the named entity identifying information, and a hidden vector D' of the part-of-speech identifying information.

The training unit 152 calculates joint attention, based on Equation (7). In Equation (7), aft denotes attention calculated based on Equation (1). att_m denotes attention for the named entity calculated based on Equation (3). att_m' denotes attention for the part of speech. The attention for the part of speech is calculated by replacing the hidden vector D of the named entity represented by Equation (3) with the hidden vector D' of the part of speech. A relationship among $\lambda_1$, $\lambda_2$, and $\lambda_3$ in Equation (7) is adjusted so that the sum becomes equal to 1 as indicated by Equation (8).

$$\text{att\_joint} = \lambda_1 * \text{att} + \lambda_2 * \text{att\_m} + \lambda_3 * \text{att\_m'} \quad (7)$$

$$\lambda_1 + \lambda_2 + \lambda_3 = 1 \quad (8)$$

Similarly to the training unit 152, the translating unit 153 may also calculate joint attention by using Equation (7) and translate a source language sentence into a target language sentence.

Second Embodiment

A translation apparatus according to a second embodiment will be described subsequently. The case has been described in which the translation apparatus 100 described in the first embodiment trains an RNN-based (seq2seq) translation model. In contrast, the translation apparatus according to the second embodiment trains a transformer-based translation model.

Figure 9:
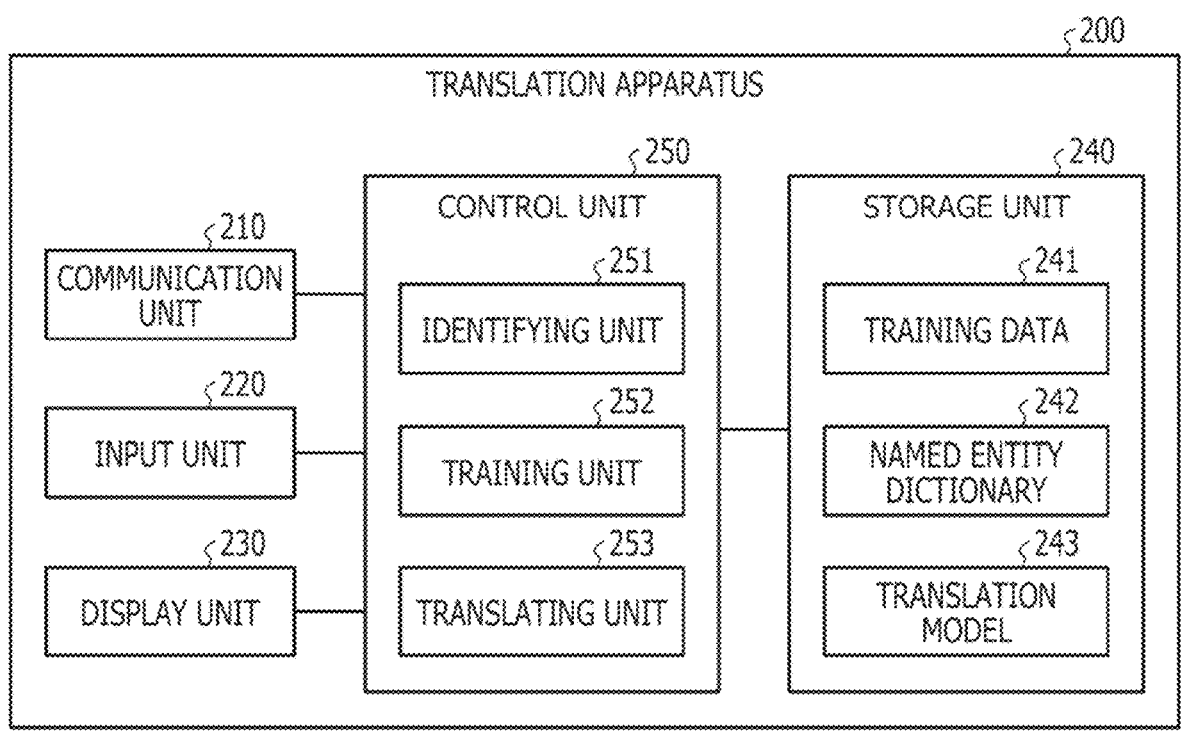
FIG. 9 is a block diagram illustrating a functional configuration of a translation apparatus according to a second embodiment.

FIG. 9 is a functional block diagram illustrating a configuration of the translation apparatus according to the second embodiment. As illustrated in FIG. 9, this translation apparatus 200 includes a communication unit 210, an input unit 220, a display unit 230, a storage unit 240, and a control unit 250.

Description regarding the communication unit 210, the input unit 220, and the display unit 230 is substantially the same as the description regarding the communication unit 110, the input unit 120, and the display unit 130 given in the first embodiment.

The storage unit 240 stores data, a program to be executed by the control unit 250, and the like. The storage unit 240 includes training data 241, a named entity dictionary 242, and a translation model 243. The storage unit 240 is an example of a storage device and is, for example, a hard disk, a memory, or the like.

The training data 241 holds a sentence in a source language and a sentence in a target language in association with each other. A sentence in the source language is referred to as a "source language sentence". A sentence in the target language is referred to as a "target language sentence". A data structure of the training data 241 is substantially the same as the data structure of the training data 141 described in FIG. 2.

The named entity dictionary 242 holds a named entity in the source language and a type of the named entity in association with each other. A data structure of the named entity dictionary 242 is substantially the same as the data structure of the named entity dictionary 142 described in FIG. 3.

Figure 10:
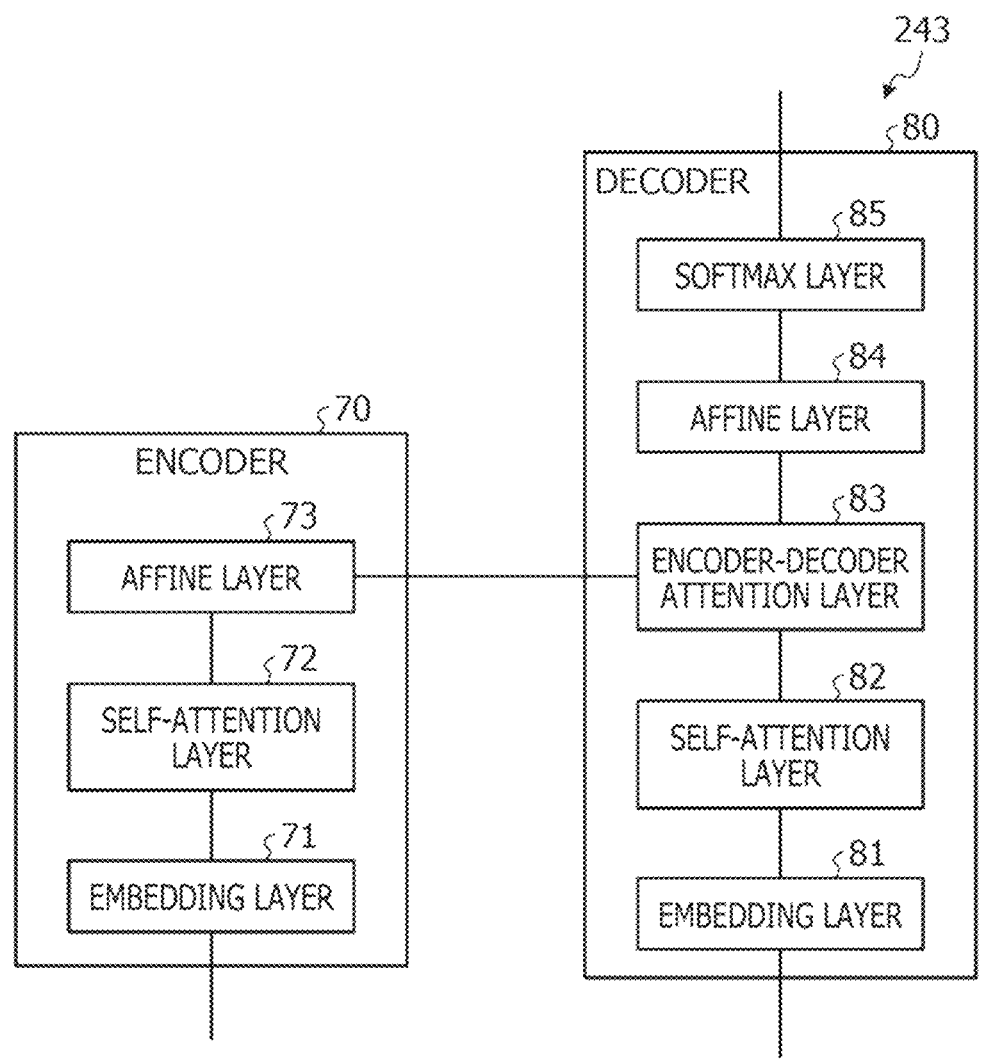
FIG. 10 is a diagram illustrating an example of a structure of a translation model according to the second embodiment.

The translation model 243 is a machine learning model for translating a source language sentence into a target language sentence. FIG. 10 is a diagram illustrating an example of a structure of the translation model according to the second embodiment. As illustrated in FIG. 10, this translation model 243 includes an encoder 70 and a decoder 80.

The encoder 70 includes an embedding layer 71, a self-attention layer 72, and an affine layer 73.

The embedding layer 71 gives a vector to an input word. For example, individual words of a source language sentence in the training data 241 are input to the embedding layer 71 sequentially from the beginning. By performing positional embedding, the embedding layer 71 assigns word position information to vectors of the respective words, converts the vectors into parallel information, and outputs the parallel information to the self-attention layer 72.

The self-attention layer 72 is a self-attention mechanism. The self-attention layer 72 calculates attention, based on Equation (9). In Equation (9), $Q_E$ denotes a product of an output result X of the embedding layer 71 and a weight $W^Q$. $K_E$ denotes a product of the output result X of the embedding layer 71 and a weight $W^K$. The square root of $d_k$ in Equation (9) indicates the dimension of $Q_E$ and $K_E$. The self-attention layer 72 outputs a calculation result to the affine layer 73.

$$att = \text{softmax}\left(\frac{Q_E K_E^T}{\sqrt{d_k}}\right) \quad (9)$$

The affine layer 73 is a fully connected layer and performs calculation based on parameters. The affine layer 73 outputs a calculation result to the decoder 80.

The decoder 80 includes an embedding layer 81, a self-attention layer 82, an encoder-decoder attention layer 83, an affine layer 84, and a softmax layer 85.

The embedding layer 81 gives a vector to an input word. For example, at the time of training, individual words of a target language sentence in the training data 241 are input to the embedding layer 81. By performing positional embedding, the embedding layer 81 assigns word position information to vectors of the respective words, converts the vectors into parallel information, and outputs the parallel information to the self-attention layer 82.

The self-attention layer 82 is a self-attention mechanism. The self-attention layer 82 calculates attention, based on Equation (10). In Equation (10), $Q_D$ denotes a product of an output result Y of the embedding layer 81 and the weight $W^Q$. $K_D$ denotes a product of the output result Y of the embedding layer 81 and the weight $W^K$. The square root of $d_k$ in Equation (10) indicates the dimension of $Q_D$ and $K_D$. The self-attention layer 82 outputs a calculation result to the encoder-decoder attention layer 83.

$$att = \text{softmax}\left(\frac{Q_D K_D^T}{\sqrt{d_k}}\right) \quad (10)$$

The encoder-decoder attention layer 83 is a self-attention mechanism that takes self-expression into account.

The affine layer 84 is a fully connected layer and performs calculation based on parameters. The affine layer 84 outputs a calculation result to the softmax layer 85.

The softmax layer 85 normalizes input values and performs an arithmetic operation so that an output sum becomes equal to 1. The softmax layer 85 outputs a probability of each of the words of the target language sentence by using the value input from the affine layer 84.

The description returns to FIG. 9. The control unit 250 is responsible for control of the entire translation apparatus 200. The control unit 250 includes an identifying unit 251, a training unit 252, and a translating unit 253.

The identifying unit 251 acquires a source language sentence and a target language sentence from the training data 241. The identifying unit 251 performs morphological analysis or the like on the source language sentence and divides the source language sentence into a plurality of words. The identifying unit 251 identifies a named entity among the words of the source language sentence, based on the individual words of the source language sentence and the named entity dictionary 242.

The identifying unit 251 generates named entity identifying information, based on the named entity identified from the source language sentence. The identifying unit 251 assigns a symbol "O" to a word not corresponding to the named entity and assigns a symbol of named entities to a word corresponding to the named entity, among the words included in the source language sentence.

The identifying unit 251 outputs information on the source language sentence, the named entity identifying information, and the target language sentence to the training unit 252. The identifying unit 251 repeatedly performs the above-described processing on each source language sentence included in the training data 241.

In a case where a source language sentence to be translated is acquired from the input unit 220 at the time of translation, the identifying unit 251 generates named entity identifying information based on the source language sentence to be translated. The identifying unit 251 outputs the source language sentence and the named entity identifying information to the translating unit 253. The identifying unit 251 may acquire the source language sentence to be translated from an external apparatus via the communication unit 210.

The training unit 252 trains the translation model 243 including an attention mechanism for named entities, based on a source language sentence, named entity identifying information, and a target language sentence.

An example of processing performed by the training unit 252 will be described by using FIG. 10. The training unit 252 inputs words of a source language sentence to the embedding layer 71 of the encoder 70. As a result, a calculation result of the embedding layer 71 is input to the self-attention layer 72, a calculation result of the self-attention layer 72 is input to the affine layer 73, and an output result X1 is output from the encoder 70.

The training unit 252 inputs symbols of the named entity identifying information to the embedding layer 71 of the encoder 70. As a result, a calculation result of the embedding layer 71 is input to the self-attention layer 72, a calculation result of the self-attention layer 72 is input to the affine layer 73, and an output result X2 is output from the encoder 70.

The output results X1 and X2 calculated by the encoder 70 are input to the encoder-decoder attention layer 83 of the decoder 80. The output result X1 corresponds to a vector of the word in the source language. The output result X2 corresponds to a vector of the named entity in the source language.

The training unit 252 inputs words of a target language sentence to the embedding layer 81 of the decoder 80. As a result, a calculation result of the embedding layer 81 is input to the self-attention layer 82, and an output result X3 of the self-attention layer 82 is input to the encoder-decoder attention layer 83. The output result X3 corresponds to a vector of the word in the target language.

The encoder-decoder attention layer 83 calculates joint attention, based on the output results X1, X2, and X3. For example, the encoder-decoder attention layer 83 uses Equation (11). A value that is greater than or equal to 0 and is less than or equal to 1 is set in advance for λ included in Equation (11).

$$\text{att\_joint} = \lambda * \text{att}_T + (1-\lambda) * \text{att}_{T\_m} \quad (11)$$

The $\text{att}_T$ included in Equation (11) denotes attention calculated based on the output results X1 and X3. For example, $\text{att}_T$ is calculated by using Equation (12). In Equation (12), $Q_{E1}$ denotes a product of the output result X3 of the self-attention layer 82 and the weight $W^Q$. $K_{E1}$ denotes a product of the output result X1 of the encoder 70 and the weight $W^K$. The square root of $d_k$ in Equation (12) indicates the dimension of $Q_{E1}$ and $K_{E1}$.

$$\text{att}_T = \text{softmax}\left(\frac{Q_{E1} K_{E1}^T}{\sqrt{d_k}}\right) \quad (12)$$

$\text{Att}_{T\_m}$ included in Equation (11) denotes attention calculated based on the output results X2 and X3. For example, $\text{att}_{T\_m}$ is calculated by using Equation (13). In Equation (13), $Q_{E1}$ denotes a product of the output result X3 of the self-attention layer 82 and the weight $W^Q$. $K_{E2}$ denotes a product of the output result X2 of the encoder 70 and the weight $W^K$. The square root of $d_k$ in Equation (13) indicates the dimension of $Q_{E1}$ and $K_{E2}$.

$$\text{att\_m} = \text{softmax}\left(\frac{Q_{E1} K_{E2}^T}{\sqrt{d_k}}\right) \quad (13)$$

The encoder-decoder attention layer 83 calculates a context vector $c_i$, based on the calculation result of the joint attention. The context vector $c_i$ is calculated by using Equation (14). In Equation (14), V denotes a product of the output result X1 and a weight $W^V$. The encoder-decoder attention layer 83 outputs the calculated context vector $c_i$ to the Affine layer 84.

$$c_i = \text{att\_joint } V \quad (14)$$

The training unit 252 adjusts the parameters of the encoder 70 and the decoder 80 such that an error between the vector output from the affine layer 84 and the vector of each word in the target language sentence decreases. For example, the training unit 252 adjusts the parameters of the encoder 70 and the decoder 80 by using a backpropagation method or the like.

The training unit 252 trains the translation model 243 by repeatedly performing the above-described processing each time the training unit 252 acquires information on a source language sentence, named entity identifying information, and a target language sentence from the identifying unit 251.

The description returns to FIG. 9. The translating unit 253 translates a source language sentence to be translated into a target language sentence by using the source language sentence and named entity identifying information of this source language sentence, which are acquired from the identifying unit 251, and by using the trained translation model 243. In the following description regarding the translating unit 253, a source language sentence to be translated is simply referred to as a source language sentence.

An example of processing performed by the translating unit 253 will be described by using FIG. 10. The translating unit 253 inputs words of a source language sentence to the embedding layer 71 of the encoder 70. As a result, a calculation result of the embedding layer 71 is input to the self-attention layer 72, a calculation result of the self-attention layer 72 is input to the affine layer 73, and an output result X1 is output from the encoder 70.

The translating unit 253 inputs symbols of the named entity identifying information to the embedding layer 71 of the encoder 70. As a result, a calculation result of the embedding layer 71 is input to the self-attention layer 72, a calculation result of the self-attention layer 72 is input to the affine layer 73, and an output result X2 is output from the encoder 70.

The output results X1 and X2 calculated by the encoder 70 are input to the encoder-decoder attention layer 83 of the decoder 80. The output result X1 corresponds to a vector of the word in the source language. The output result X2 corresponds to a vector of the named entity in the source language.

The translating unit 253 inputs a word of the target language sentence in each step to the embedding layer 81 of the decoder 80. The decoder 80 at the time of translation outputs a word of the target language sentence in each step. For example, a word of the target language sentence generated in the immediately preceding step and the context vector of the source language sentence from the encoder 70 side are input to a hidden layer of the decoder 80 as inputs, so that the decoder 80 at the time of translation generates the next word. The next word is repeatedly generated until a special character <EOS> indicating the end of the sentence is output, and then translation ends. For example, information input to the embedding layer 81 is a word of the target language sentence generated immediately before. As a result, a calculation result of the embedding layer 81 is input to the self-attention layer 82, and an output result X3 of the self-attention layer 82 is input to the encoder-decoder attention layer 83. The output result X3 corresponds to a vector of the word in the target language.

The encoder-decoder attention layer 83 calculates joint attention, based on the output results X1, X2, and X3 in accordance with Equation (11). The encoder-decoder attention layer 83 calculates a context vector $c_i$, based on Equation (14). The encoder-decoder attention layer 83 outputs the calculated context vector $c_i$ to the Affine layer 84.

In response to input of the context vector $c_i$, the affine layer 84 performs calculation by using the parameters and outputs a calculation result to the softmax layer 85.

The softmax layer 85 normalizes input values and performs an arithmetic operation so that an output sum becomes equal to 1. The softmax layer 85 outputs a probability of each of the words of the target language sentence by using the value input from the affine layer 84. Based on the probabilities of the respective words output from the softmax layer 85, the translating unit 253 generates a target language sentence by repeatedly performing processing of conversion into the word that has the highest probability. The translating unit 253 may output the generated target language sentence as a translation result to the display unit 230 for display, or may transmit the translation result to an external apparatus.

An example of a procedure of processing performed by the translation apparatus 200 according to the second embodiment will be described next. Processing performed at the time of training and processing performed at the time of translation by the translation apparatus 200 will be described in order.

Figure 11:
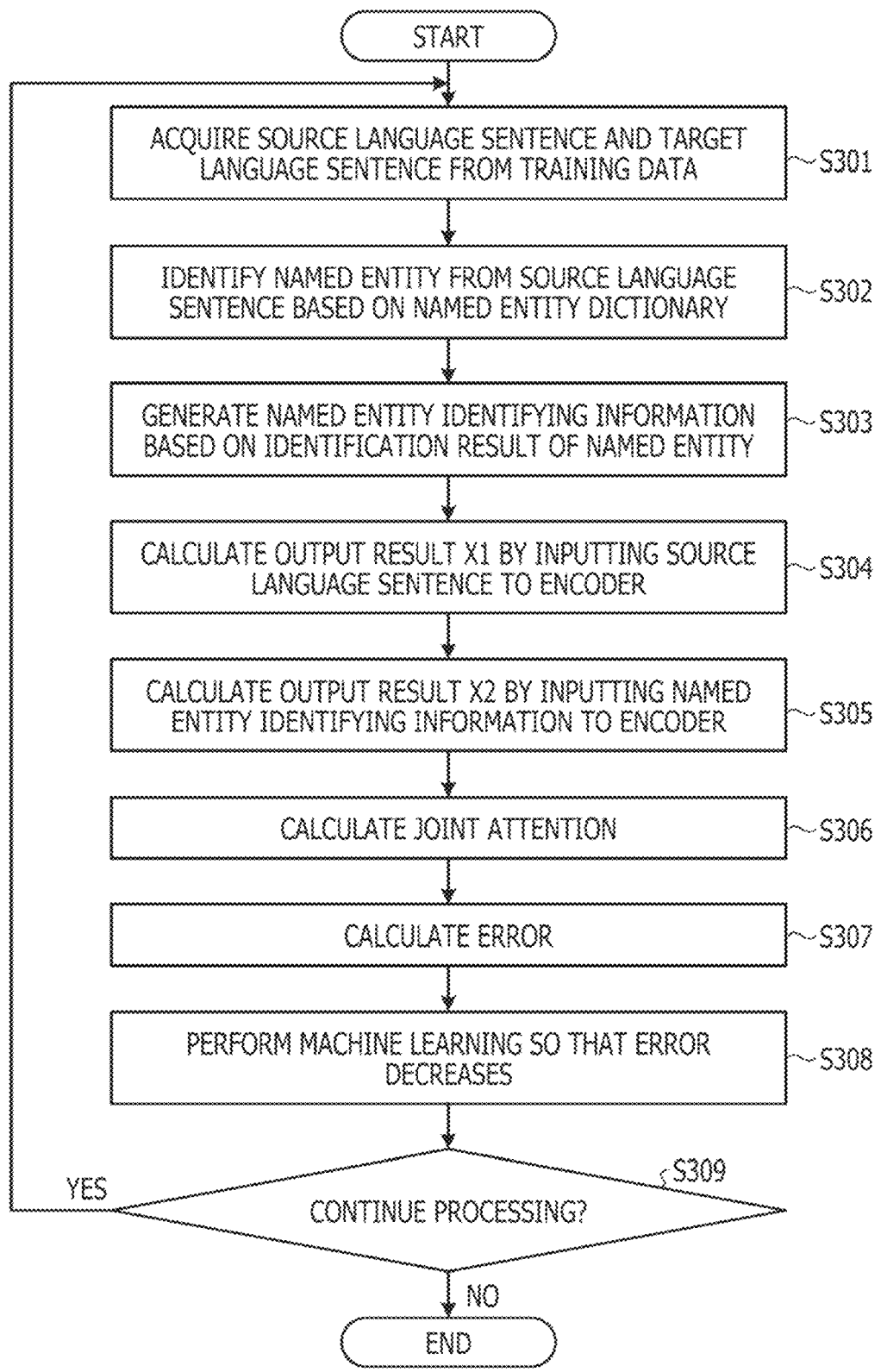
FIG. 11 is a flowchart of processing performed at the time of training according to the second embodiment.

FIG. 11 is a flowchart of processing performed at the time of training according to the second embodiment. As illustrated in FIG. 11, the identifying unit 251 of the translation apparatus 200 acquires a source language sentence and a target language sentence from the training data 241 (step S301). The identifying unit 251 identifies a named entity from the source language sentence, based on the named entity dictionary 242 (step S302).

The identifying unit 251 generates named entity identifying information, based on the identification result of the named entity (step S303). The training unit 252 of the translation apparatus 200 calculates the output result X1 by inputting the source language sentence to the encoder 70 (step S304). The training unit 252 calculates the output result X2 by inputting the named entity identifying information to the encoder 70 (step S305).

The training unit 252 calculates joint attention by using the encoder-decoder attention layer 83 (step S306). The training unit 252 calculates an error between the value output from the affine layer 84 and the vector of the word of the target language sentence (step S307). The training unit 252 performs machine learning so that the error decreases (step S308).

In a case where the processing is to be continued (Yes in step S309), the translation apparatus 200 causes the processing to proceed to step S301. On the other hand, in a case where the processing is not to be continued (No in step S309), the translation apparatus 200 ends training of the translation model 243.

Figure 12:
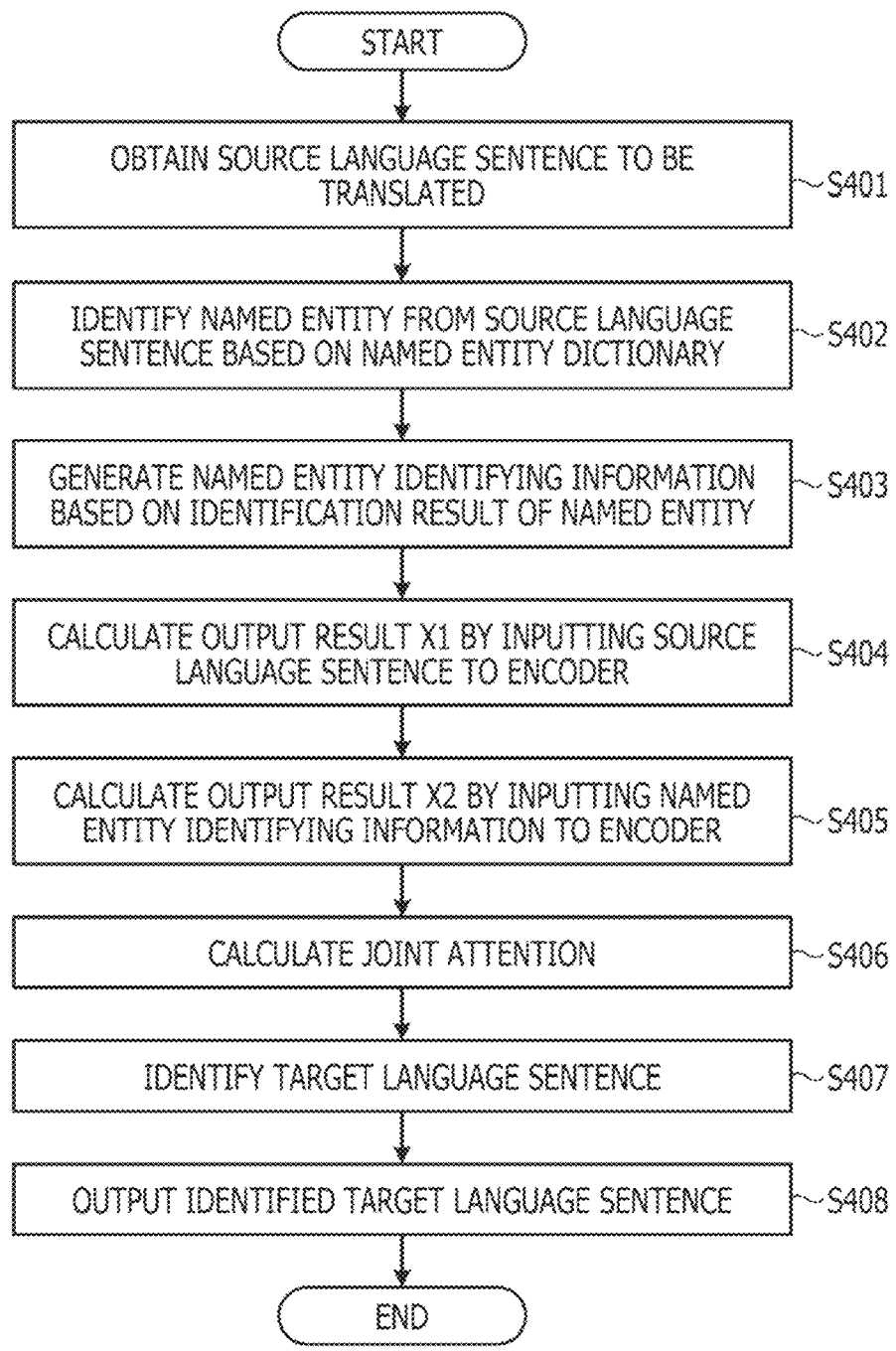
FIG. 12 is a flowchart of processing performed at the time of translation according to the second embodiment.

FIG. 12 is a flowchart of processing performed at the time of translation according to the second embodiment. As illustrated in FIG. 12, the identifying unit 251 of the translation apparatus 200 acquires a source language sentence to be translated from the input unit 220 (step S401). The identifying unit 251 identifies a named entity from the source language sentence, based on the named entity dictionary 242 (step S402).

The identifying unit 251 generates named entity identifying information, based on the identification result of the named entity (step S403). The translating unit 253 of the translation apparatus 200 calculates the output result X1 by inputting the source language sentence to the encoder 70 (step S404). The translating unit 253 calculates the output result X2 by inputting the named entity identifying information to the encoder 70 (step S405).

The translating unit 253 calculates joint attention by using the encoder-decoder attention layer 83 (step S406). The translating unit 253 identifies a target language sentence from the output result of the softmax layer 85 (step S407). The translating unit 253 outputs the identified target language sentence to the display unit 230 (step S408).

Effects of the translation apparatus 200 according to the second embodiment will be described next. When performing machine learning by using the training data 241, the translation apparatus 200 identifies a named entity in the source language and generates the translation model 243 including an attention mechanism (the encoder-decoder attention layer 83) for named entities. The use of this translation model 243 enables translation to be performed while taking into account a balance between the meaning of a word in the source language sentence and the named entity. Thus, mistranslation of a word with multiple meanings including a named entity may be avoided.

Figure 13:
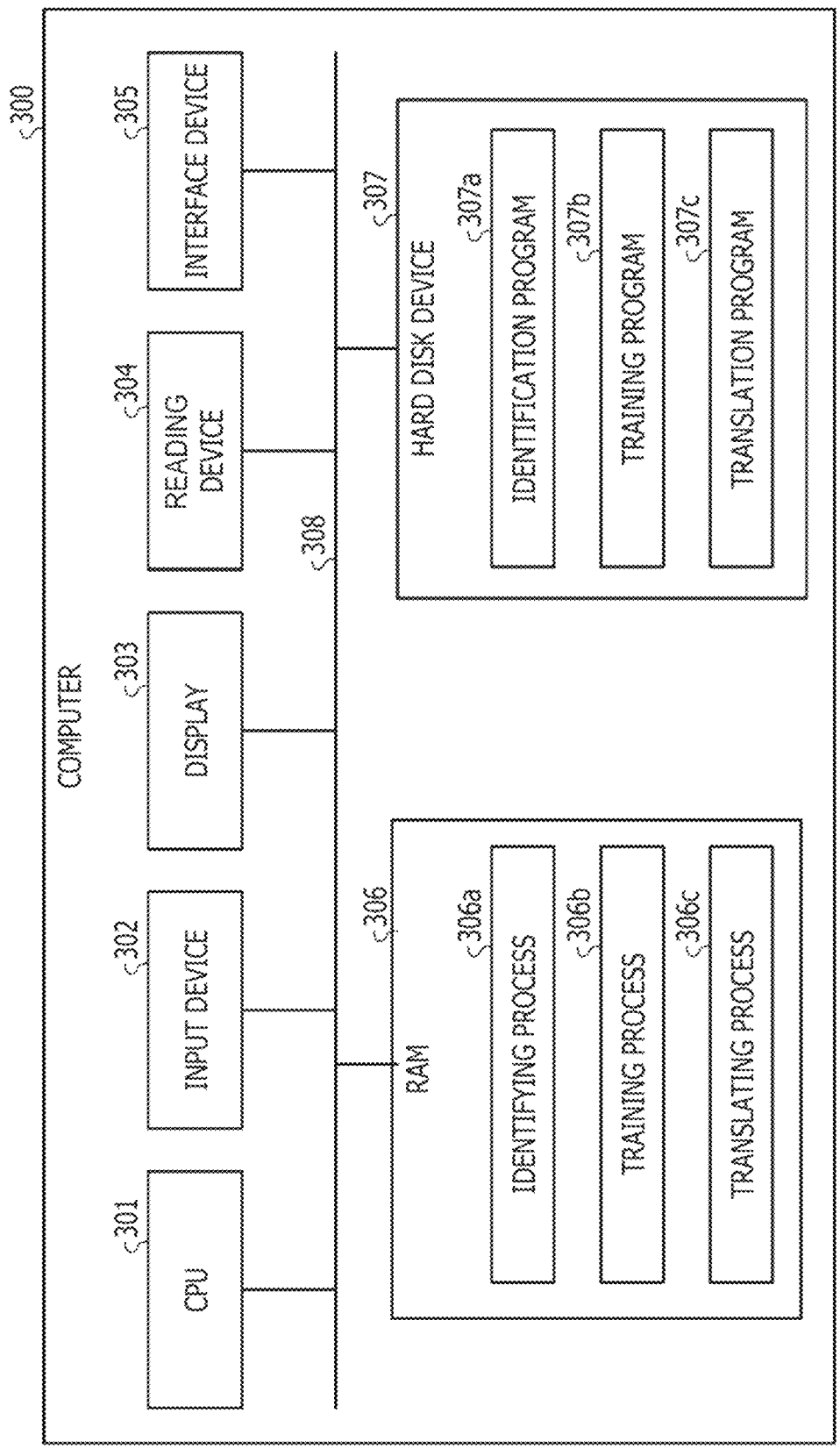
FIG. 13 is a diagram illustrating an example of a hardware configuration of a computer that implements substantially the same functions as the translation apparatus according to the present embodiments.

An example of a hardware configuration of a computer (information processing apparatus) that implements the substantially the same functions as the translation apparatus 100 (200) described in the present embodiments will be described next. FIG. 13 is a diagram illustrating an example of a hardware configuration of a computer that implements substantially the same functions as the translation apparatus according to the present embodiments.

As illustrated in FIG. 13, a computer 300 includes a central processing unit (CPU) 301 that performs various kinds of arithmetic operation processing, an input device 302 that receives input of data from a user, and a display 303. The computer 300 also includes a reading device 304 that reads a program or the like from a storage medium, and an interface device 305 that exchanges data with an external apparatus or the like via a wired or wireless network. The computer 300 includes a random-access memory (RAM) 306 that temporarily stores various kinds of information, and a hard disk device 307. The CPU 301, the input device 302, the display 303, the reading device 304, the interface device 305, the RAM 306, and the hard disk device 307 are coupled to a bus 308.

The hard disk device 307 includes an identification program 307a, a training program 307b, and a translation program 307c. The CPU 301 reads the identification program 307a, the training program 307b, and the translation program 307c and loads the identification program 307a, the training program 307b, and the translation program 307c into the RAM 306.

The identification program 307a functions as an identifying process 306a. The training program 307b functions as a training process 306b. The translation program 307c functions as a translating process 306c.

Processing performed by the identifying process 306a corresponds to the processing performed by the identifying units 151 and 251. Processing performed by the training process 306b corresponds to the processing performed by the training units 152 and 252. Processing performed by the translating process 306c corresponds to the processing performed by the translating units 153 and 253.

The individual programs 307a to 307c may not necessarily be stored in the hard disk device 307 from the beginning. For example, the individual programs are stored in a "portable physical medium" such as a flexible disk (FD), a compact disc read-only memory (CD-ROM), a digital versatile disc (DVD), a magneto-optical disk, or an integrated circuit (IC) card to be inserted into the computer 300. The computer 300 may then read and execute each of the programs 307a to 307c.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing a program for causing a computer to execute a process, the process comprising:
acquiring training data that includes a first sentence expressed in a first language and a second sentence expressed in a second language;
identifying a named entity and parts of speech from the first sentence; and
generating, based on the training data, a translation model that includes a joint attention mechanism for the named entity and the parts of speech.

2. The non-transitory computer-readable recording medium according to claim 1, wherein
the translation model includes an encoder and a decoder, a calculation result of the encoder is input to the decoder, the decoder includes the joint attention mechanism, and the process further comprises:
converting, based on a result of the identifying the named entity, the first sentence into named entity identifying information in which each word included in the first sentence is converted to either a symbol that represents named entities or a symbol that does not represent named entities, and
training the translation model by using a value obtained by inputting a first calculation result and a second calculation result to the joint attention mechanism, the first calculation result being calculated as a result of inputting the first sentence to the encoder, the second calculation result being calculated as a result of inputting the named entity identifying information to the encoder.

3. The non-transitory computer-readable recording medium according to claim 2, the process further comprising:
converting, based on a result of the identifying the parts of speech, the first sentence into part-of-speech identifying information in which each word included in the first sentence is converted to a symbol that corresponds to a part of speech of the word; and
training the translation model by further using a value obtained by inputting a third calculation result to the joint attention mechanism, the third calculation result being calculated as a result of inputting the part-of-speech identifying information to the encoder.

4. The non-transitory computer-readable recording medium according to claim 1, wherein the joint attention mechanism includes a combination of an attention mechanism for the parts of speech and an attention mechanism for the named entity.

5. A machine learning method, comprising:
acquiring, by a computer, training data that includes a first sentence expressed in a first language and a second sentence expressed in a second language;
identifying a named entity and parts of speech from the first sentence; and
generating, based on the training data, a translation model that includes a joint attention mechanism for the named entity and the parts of speech.

6. The machine learning method according to claim 5, wherein
the translation model includes an encoder and a decoder, a calculation result of the encoder is input to the decoder, the decoder includes the joint attention mechanism, and the machine learning method further comprises:
converting, based on a result of the identifying the named entity, the first sentence into named entity identifying information in which each word included in the first sentence is converted to either a symbol that represents named entities or a symbol that does not represent named entities, and
training the translation model by using a value obtained by inputting a first calculation result and a second calculation result to the joint attention mechanism, the first calculation result being calculated as a result of inputting the first sentence to the encoder, the second calculation result being calculated as a result of inputting the named entity identifying information to the encoder.

7. The machine learning method according to claim 6, further comprising:
converting, based on a result of the identifying the parts of speech, the first sentence into part-of-speech identifying information in which each word included in the first sentence is converted to a symbol that corresponds to a part of speech of the word; and
training the translation model by further using a value obtained by inputting a third calculation result to the joint attention mechanism, the third calculation result being calculated as a result of inputting the part-of-speech identifying information to the encoder.

8. The machine learning method according to claim 5, wherein the joint attention mechanism is based on a combination of an attention mechanism for the parts of speech and an attention mechanism for the named entity.

9. An information processing apparatus, comprising:
a memory; and
a processor coupled to the memory and the processor configured to:
acquire a first sentence expressed in a first language;
identify a named entity and parts of speech from the first sentence; and
generate a second sentence expressed in a second language, based on the first sentence and a translation model that includes a joint attention mechanism for the named entity and the parts of speech.

10. The information processing apparatus according to claim 9, wherein
the translation model includes an encoder and a decoder, a calculation result of the encoder is input to the decoder, the decoder includes the joint attention mechanism, and the processor is further configured to:
convert, based on a result of the identification of the named entity, the first sentence into named entity identifying information in which each word included in the first sentence is converted to either a symbol that represents named entities or a symbol that does not represent named entities, and
generate the second sentence by using a value obtained by inputting a first calculation result and a second calculation result to the joint attention mechanism, the first calculation result being calculated as a result of inputting the first sentence to the encoder, the second calculation result being calculated as a result of inputting the named entity identifying information to the encoder.

11. The information processing apparatus according to claim 10, wherein the processor is further configured to:

convert, based on a result of the identification of the parts of speech, the first sentence into part-of-speech identifying information in which each word included in the first sentence is converted to a symbol that corresponds to a part of speech of the word; and generate the second sentence by further using a value obtained by inputting a third calculation result to the joint attention mechanism, the third calculation result being calculated as a result of inputting the part-of-speech identifying information to the encoder.

12. The information processing apparatus according to claim 9, wherein the joint attention mechanism includes a combination of an attention mechanism for the parts of speech and an attention mechanism for the named entity.

\* \* \* \* \*